(12) United States Patent
Todd et al.

(10) Patent No.: US 7,818,533 B2
(45) Date of Patent: *Oct. 19, 2010

(54) STORING LOCATION IDENTIFIER IN ARRAY AND ARRAY POINTER IN DATA STRUCTURE FOR WRITE PROCESS MANAGEMENT

(75) Inventors: Kenneth Wayne Todd, Tucson, AZ (US); Kevin John Ash, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/409,337

(22) Filed: Mar. 23, 2009

(65) Prior Publication Data

US 2009/0177859 A1    Jul. 9, 2009

Related U.S. Application Data

(63) Continuation of application No. 10/815,319, filed on Mar. 31, 2004, now Pat. No. 7,529,904.

(51) Int. Cl.
*G06F 12/00* (2006.01)

(52) U.S. Cl. ............... 711/170; 711/112; 707/821; 710/3

(58) Field of Classification Search .......... 711/170, 711/112; 707/205; 710/3
See application file for complete search history.

(56) References Cited

U.S. PATENT DOCUMENTS

| | | |
|---|---|---|
| 5,394,532 A | 2/1995 | Belsan |
| 5,414,826 A | 5/1995 | Garcia |
| 5,530,829 A | 6/1996 | Beardsley et al. |
| 5,644,784 A | 7/1997 | Peek |
| 5,720,029 A | 2/1998 | Kern et al. |
| 5,991,775 A | 11/1999 | Beardsley et al. |
| 6,622,205 B1 | 9/2003 | Weiss |

(Continued)

FOREIGN PATENT DOCUMENTS

CN    1359493    7/2002

(Continued)

OTHER PUBLICATIONS

Patent Abstract for CN1359493, published on Jul. 17, 2002, 1 pg.

(Continued)

*Primary Examiner*—Hong Kim
(74) *Attorney, Agent, or Firm*—William K. Konrad; Konrad Raynes & Victor LLP

(57) ABSTRACT

Provided are a method, system, and program for managing write processes in which a list of destination location identifiers for pending write operations is maintained in an array having an array pointer which identifies the next available entry of the array. In one embodiment, the array includes a stack of variable size. Adding a destination location identifier of a pending write operation increases the size of the stack. Removing a destination location identifier of a completed write operation reduces the size of the stack. A stack index may be incremented as write operation destination location identifiers are added and may be decremented as write operation destination location identifiers are removed from the stack.

12 Claims, 7 Drawing Sheets

U.S. PATENT DOCUMENTS

| | | | |
|---|---|---|---|
| 6,735,207 | B1 | 5/2004 | Prasad et al. |
| 6,865,648 | B1 | 3/2005 | Naamad et al. |
| 7,216,199 | B2 | 5/2007 | Mizuno |
| 7,529,904 | B2 * | 5/2009 | Todd et al. ............... 711/170 |
| 2002/0112133 | A1 | 8/2002 | Gagne et al. |

FOREIGN PATENT DOCUMENTS

| | | |
|---|---|---|
| JP | 62089273 | 4/1987 |
| JP | 62284437 | 12/1987 |
| JP | 05134919 | 6/1993 |
| JP | 11110266 | 4/1999 |
| JP | 11154058 | 6/1999 |
| JP | 2002278707 | 9/2002 |
| JP | 2004078902 | 9/2008 |
| WO | 03096192 | 11/2003 |

OTHER PUBLICATIONS

Patent Abstract and Translation for JP2002278707, published on Sep. 27, 2002, 1 pg.

Patent Abstract for JP62284437, published on Dec. 10, 1987, 1 pg.

Patent Abstract for JP62089273, published on Apr. 23, 1987, 1 pg.

Patent Abstract and Translation for JP11154058, published on Jun. 8, 1999, 1 pg.

Patent Abstract and Translation for JP11110266, published on Apr. 23, 1999, 1 pg.

Patent Abstract and Translation for JP2004078902, published on Mar. 11, 2004, 1 pg.

Patent Abstract and Translation for JP05134919, published on Jun. 1, 1993, 1 pg.

* cited by examiner

STORING LOCATION IDENTIFIER IN ARRAY AND ARRAY POINTER IN DATA STRUCTURE FOR WRITE PROCESS MANAGEMENT

RELATED APPLICATIONS

This application is a continuation application of copending parent application Ser. No. 10/815,319, filed Mar. 31, 2004, entitled METHOD, SYSTEM, AND PROGRAM FOR WRITE PROCESS MANAGEMENT and now issued as U.S. Pat. No. 7,529,904 and assigned to the assignee of the present application.

BACKGROUND OF THE INVENTION

1. Field of the Invention

The present invention relates to a method, system, and program for managing write processes to a storage unit.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller.

A disk-shaped storage medium may be subdivided into physical portions, each of which is "pie-shaped" and is often referred to as a "sector." Dividing the circular medium into pie slices facilitates location of data by the read/write heads of the drive. The diskette or disk is also typically divided into a number of concentric circles or tracks. Each track is typically divided into a number of clusters that represent the smallest unit of storage that is addressable for a read or write operation. Typically, a cluster is 256 or 512 bytes in length. Thus, data can be located by identifying one or more of the sectors, the concentric track and the clusters in which the data is stored.

In a write operation, data may be written to a storage medium. Should the write operation be interrupted by a power failure or device malfunction, the data written to the storage medium may be corrupted or otherwise incomplete. Accordingly, storage controllers frequently maintain a list of the destination locations in which data is being written. The list of destination locations for pending write operations is often kept in nonvolatile storage (NVS) memory so that the list information will be maintained even if power is lost.

Once a write operation to a particular destination location is completed, the destination location of that particular write operation may be removed from the list. However, should the write operations be interrupted before completion, the list of destination locations for pending write operations may be examined to identify the write destination locations which may contain incomplete or corrupted data.

FIG. 1 shows an example of a typical prior art pending write operation destination location list 10. In the example of FIG. 1, the list 10 has a plurality of entries 12a, 12b . . . 12n, each of which is capable of storing a destination location of a pending write operation. In the example of FIG. 1, the destination location is identified by a track identification ("track ID") as shown by list entry 12c, for example. Following each entry of a track ID into one of the list entries 12a, 12b . . . 12n, a logical redundancy check may be performed on the contents of the list 10 and the check results can be stored in an entry 14.

Upon completion of a write operation, the track ID of the destination location of that write operation may be removed from the list 10 as shown by the list entry 12b, for example. In the example of FIG. 1, the list entries 12b, 12d, 12e and 12n are indicated to be available to store a track ID. Again, following the removal of a track ID from one of the list entries 12a, 12b . . . 12n, a logical redundancy check may be performed on the contents of the list 10 and the check results may be stored in the logical redundancy check entry 14.

To facilitate rapid identification of the available list entries of the list 10, a list of the available entries of the list 10 is often maintained. In the example of FIG. 1, the available list entries, such as entries 12b, 12d, 12e, for example, each contain a pointer which identifies the location of the next available list entry of the list entries 12a, 12b, 12n. Such a pointer may take the form of an address offset, for example. However, the last available entry of the list 10, such as entry 12n, for example, may not contain a pointer since there is no next available entry after the last one. At initialization, prior to the initiation of write operations, each of the list entries 12a, 12b, . . . 12n of the list 10 may be available. Hence, when the list 10 is initialized, the list 10 may contain a pointer for each of the list entries 12a, 12b, . . . except last entry 12n.

During operation, should the pending write operations be interrupted before completion, the list 10 of track ID's for pending write operations may be traversed. In this manner, the track ID's of the destination locations of the pending write operations, which may contain incomplete or corrupted data, may be identified.

SUMMARY OF THE DESCRIBED IMPLEMENTATIONS

Provided are a method, system, and program for managing write processes in which a list of destination location identifiers for pending write operations is maintained in an array having an array pointer which identifies the next available entry of the array. In one embodiment, the array includes a stack of variable size. Adding a destination location identifier of a pending write operation increases the size of the stack. Removing a destination location identifier of a completed write operation reduces the size of the stack. A stack index may be incremented as write operation destination location identifiers are added and may be decremented as write operation destination location identifiers are removed from the stack.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments. It is understood that other embodiments may be utilized and structural and operational changes may be made without departing from the scope of the present description.

Figure 1:
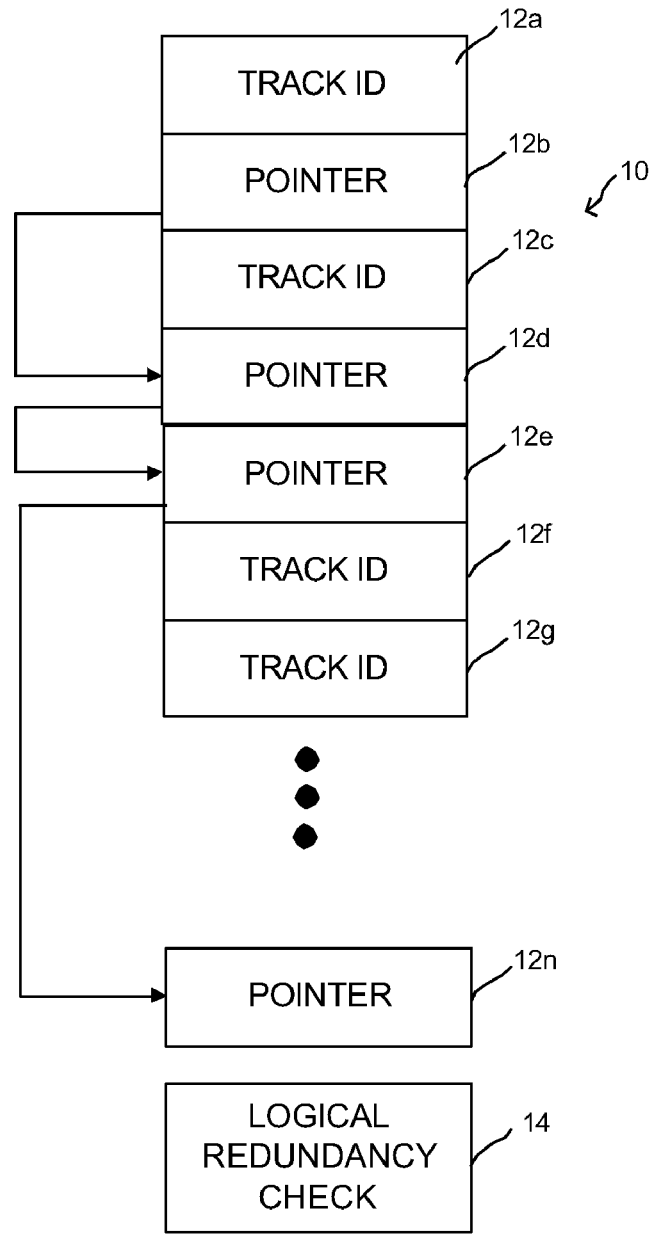
FIG. 1 is a schematic diagram of prior art logic structure for tracking pending write operations.
Figure 2:
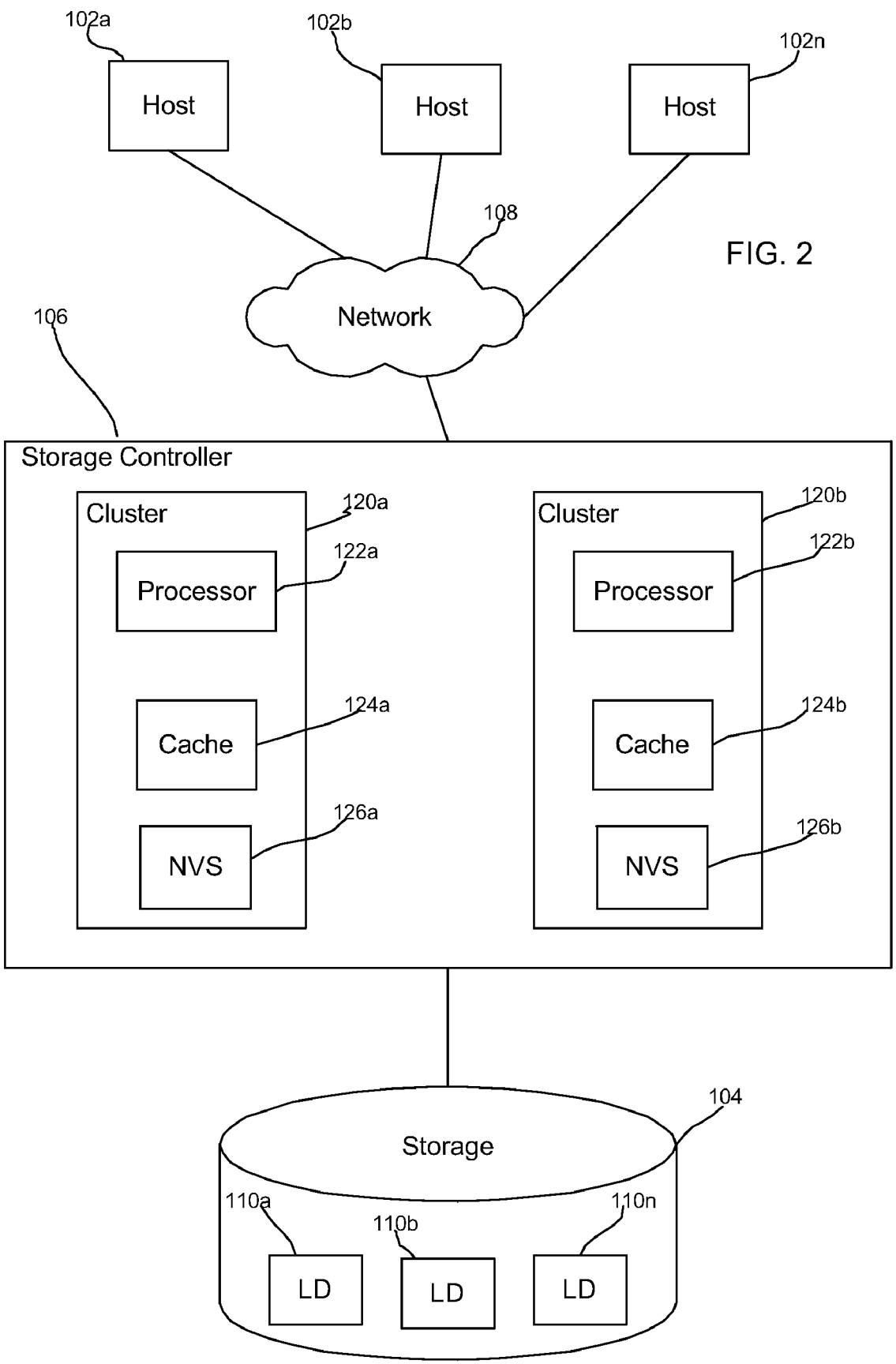
FIG. 2 illustrates an example of a computing environment in which aspects of the illustrated embodiments may be implemented.

FIG. 2 illustrates a computing architecture in which aspects of the illustrated embodiments are implemented. One or more hosts 102a, 102b . . . 102n are in data communication with a storage system 104, such as a DASD or any other storage system known in the art, via a storage controller 106. The host 102 may be any computing device known in the art, such as a server, mainframe, workstation, personal computer, hand held computer, laptop, telephony device, network appliance, etc. The storage controller 106 and host system(s) 102 communicate via a network 108, which may comprise a Storage Area Network (SAN), Local Area Network (LAN), Intranet, the Internet, Wide Area Network (WAN), etc. The storage system 104 may be comprised of hard disk drives, tape cartridge libraries, optical disks, or any suitable non-volatile storage medium known in the art. The storage system 104 may be arranged as an array of storage devices, such as a Just a Bunch of Disks (JBOD), DASD, Redundant Array of Independent Disks (RAID) array, virtualization device, etc. The storage controller 106 may comprise any storage controller or server known in the art, such as the IBM Enterprise Storage Server (ESS) or any other storage controller known in the art. In certain implementations, the storage space in the storage controller 104 is configured as a plurality of logical devices (LD) 110a, 110b . . . 110n.

The storage controller 106 includes two separate clusters 120a, 120b of hardware components to provide redundancy for improved availability. Although the illustrated embodiment is described in connection with a storage controller having clusters, it is appreciated that the invention may be applicable to a variety of systems utilizing one or more processors.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b . . . 102n can submit application I/O requests directed to a target logical device (LD) 110a, 110b . . . 110n, including write data, to the cluster 120a, 120b to which the target logical device (LD) 110a, 110b . . . 110n is assigned. The NVS 126a, 126b in one cluster 120a, 120b is used to backup write data in the cache 124b, 124a in the other cluster 120b, 120a, e.g., NVS 126a backs up write data in cache 124b.

Figures 3A, 3B:
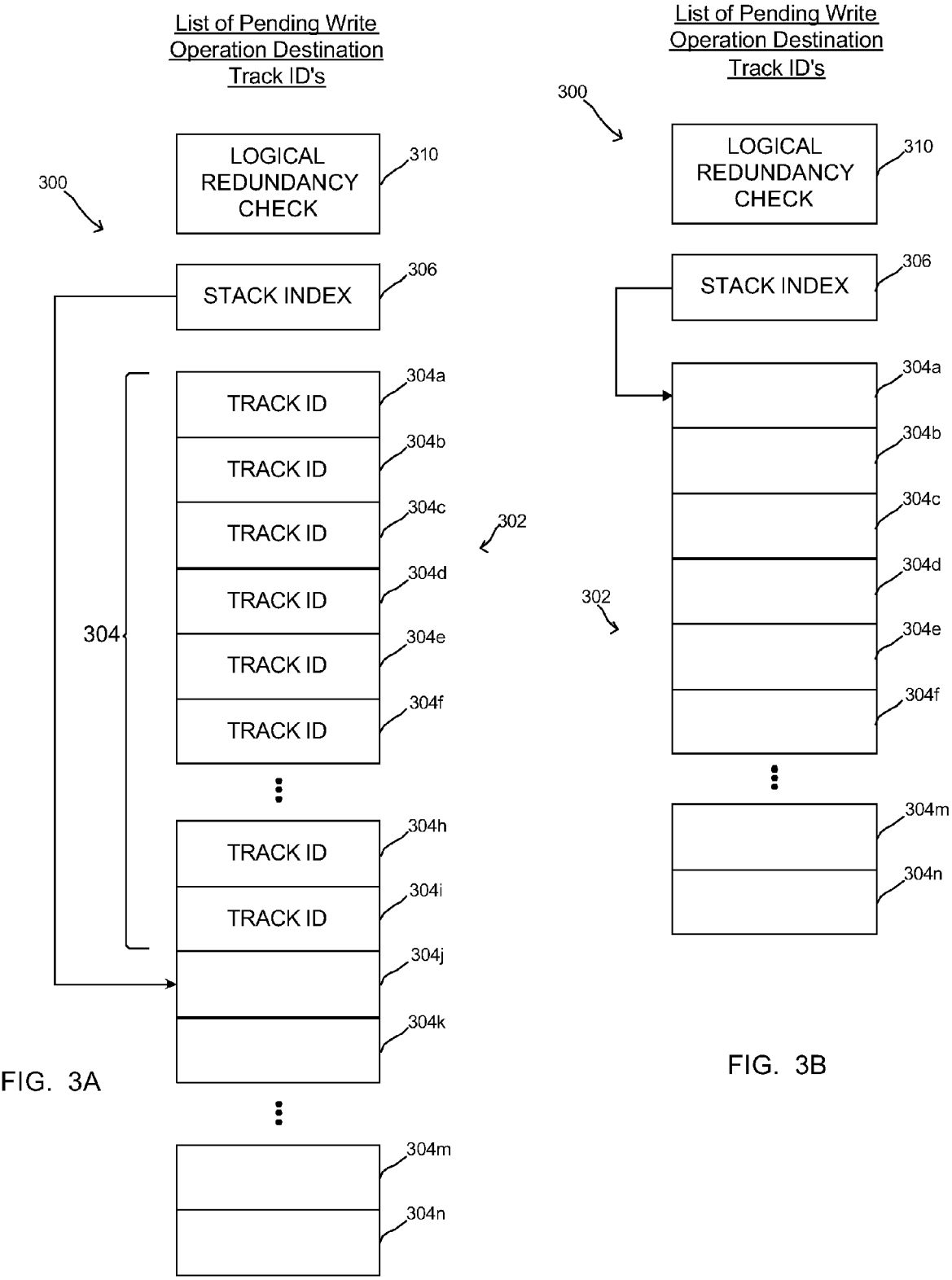
FIGS. 3A-3B are schematic diagrams of a logic structure for tracking pending write operations in accordance with one aspect of the illustrated embodiments.

FIG. 3A shows an example of a logic structure 300 which can maintain a list of destination locations for pending write operations. The structure 300 includes an array 302 of entries 304a, 304b, . . . 304n, each of which is capable of storing the destination location of a pending write operation. In the illustrated embodiment, a destination location of a write operation is identified with a track ID. It is appreciated that other destination location identifiers may be used including cylinders, sectors, clusters, addresses etc.

In accordance with one aspect of the described embodiments, the structure 300 further includes an array pointer 306 which identifies the next available entry of the array 304 in which the destination location of a pending write operation may be stored. In the illustrated embodiment, a portion 304 of the entire array of entries 304a, 304b, . . . 304n provides a stack of adjacent list entries 304a, 304b, . . . 304i, in which a destination location such as a track ID is stored in each stack entry 304a, 304b, . . . 304i. The array pointer 306 comprises a stack index which points to the next available entry of the array 302 and thus indicates the first entry after the end of the stack 304 of stored track ID's. In the example of FIG. 3A, the last entry of the stack 304 is the entry 304i and the first available entry is entry 304j of the array of entries 304a, 304b, . . . 304n.

In one application of such a logic structure, a traversal of array entries to determine destination locations of pending write operations may be limited to the stack 304 of entries 304a, 304b, . . . 304i which actually contain track ID's rather than the entire array 302 of entries 304a, 304b, . . . 304n which includes empty or invalid entries 304j . . . 304n. In another application of such a logic structure 300, a logical redundancy check of array entries following a change to the array 302 may be limited to the stack of entries 304a, 304b, . . . 304i which actually contain valid track ID's rather than include the entire array of entries 304a, 304b, . . . 304n which includes empty or invalid entries 304j . . . 304n. The logical redundancy check may be stored in an entry 310. It is appreciated that the stack, the array of entries and the array pointer to an available entry may be arranged in other forms.

Figure 4:
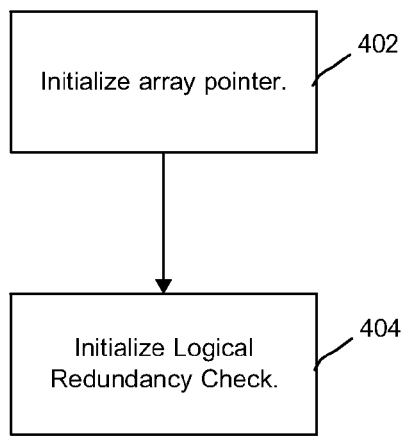
FIG. 4 illustrates operations of a storage controller in initializing a logic structure such as the structure of FIG. 3A.

FIG. 4 illustrates operations of a storage controller 106 in initializing a logic structure such as the structure 300 of FIG. 3A, which maintains a list of destination locations for pending write operations. In the embodiment of FIG. 4, an array pointer for the logic structure is initialized (block 402). In the illustrated embodiment, this may be readily achieved by initializing the stack 302 to zero as shown in FIG. 3B. In this example, the stack index 306 is reset to point to the first array entry 304a which is empty. Thus, the stack 304 does not have any entries when the logic structure 300 is initialized as shown in FIG. 3B.

In addition, a logical redundancy check may be initialized (block 404, FIG. 4). Again, in the illustrated embodiment, the logical redundancy check 310 of FIG. 3B may be readily initialized by setting the contents of the check 310 to zero.

Figure 5:
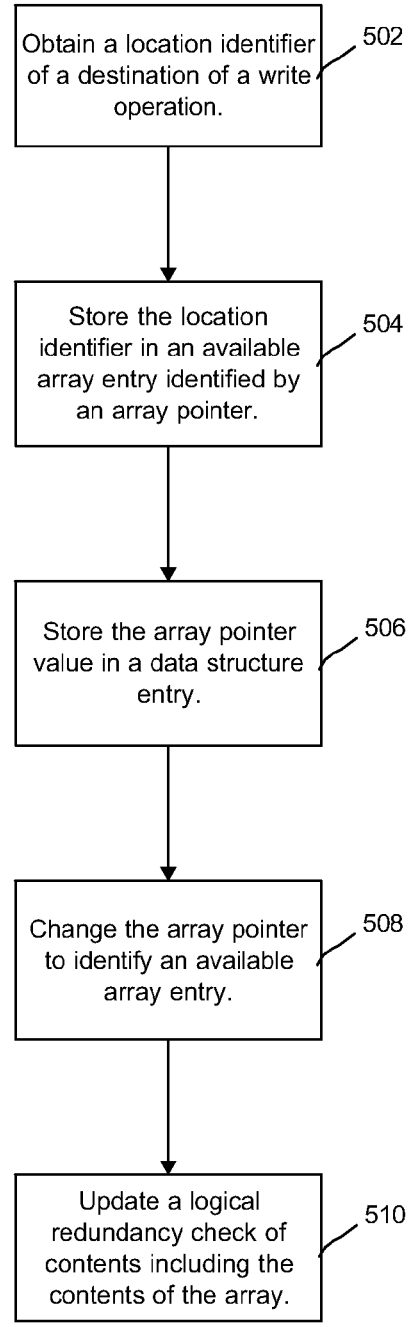
FIG. 5 illustrates operations of a storage controller in storing in a logic structure such as the logic structure of FIG. 3A, a location identifier of the destination of a pending write operation in which data is being written to storage.
Figure 6:
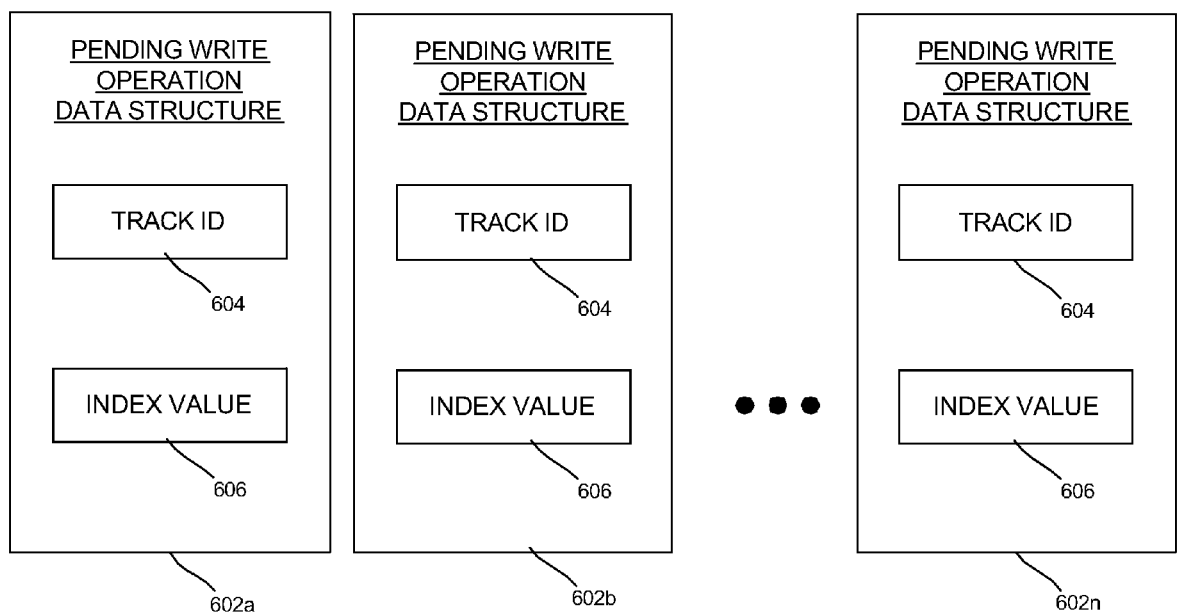
FIG. 6 illustrates an example of a data structure which stores a variety of parameters used in a write operation.

FIG. 5 illustrates operations of a storage controller 106 in storing in a logic structure such as the logic structure 300 of FIG. 3A, a location identifier of the destination of a pending write operation in which data is written to storage such as the storage 104. In the embodiment of FIG. 5, the storage controller 106 obtains (block 502) the location identifier of a destination from the write operation. In the illustrated embodiment, the destination location identifier for a write operation is provided to the storage controller 106 in the form of a pointer to a data structure such as one of the data structures 602a, 602b, . . . 602n shown in FIG. 6. Each pending write operation maintains in the cache memory 124a, 124b, an associated data structure 602a, 602b, 602n. Each data structure has a number of fields, each of which stores one of a variety of parameters used in the write operation. One such parameter is the track ID which identifies the location of the destination of the data being written by the write operation to the storage 104. The track ID is stored in a field 604 of the associated data structure. Thus, in response to receipt of a pointer to one of the data structures 602a, 602b, . . . 602n, the storage controller 106 obtains (block 502) from the indicated data structure, the track ID of the destination of the data being written in the write operation. It is appreciated that the location identifier of a destination of a write operation may be obtained in a variety of manners, including being provided the destination location identifier directly by the write operation.

The storage controller 106 stores (block 504) the obtained location identifier in an available array entry which is identified by an array pointer. In the embodiment, of FIG. 3A, the array pointer is implemented by the stack index 306 which points to the next availably entry of the array 302. In the example of FIG. 3A, each of stack entries 304a-304i has already been filled with a track ID for an associated write operation. Hence, the stack index 306 points to the next available array entry 304j. Thus, the storage controller 106 stores (block 504) the obtained track ID in the available array entry 304j identified by the stack index 306. Once filled with a write operation destination location identifier, the array entry 304j becomes a part of the stack 304.

Also, the value of the array pointer is stored (block 506) in the data structure from which the location identifier was originally obtained. In the example of FIG. 3A, the value of the stack index 306 is an offset which points to the array entry 304j. This offset value is stored (block 506) in a field 606 of the data structure 602a, 602b, . . . 602n from which the track ID stored in the array entry 304j was obtained.

Still further, the contents of the array pointer is changed (block 508) to identify an available array entry. In the example of FIG. 3A, the stack index 306 is incremented to point to the next available array entry which is array entry 304k after array entry 304j has been filled with a track ID. The array entry 304k is immediately adjacent to the array entry 304j within the array 302.

Also, the logical redundancy check of the contents of the logic structure 300 may be updated (block 510). In the illustrated embodiment, the logical redundancy check may be performed for the contents of the stack 304 which, in the example of FIG. 3A, is the contents of array entries 304a-304j (after array entry 304j has been filled with a track ID) together with the contents of the stack index 306. The updated logical redundancy check may be stored (block 510) in the logical redundancy check 310. Thus, in some applications, the empty array entries such as array entries 304k-304n need not be traversed and may effectively be ignored during the logical redundancy check.

Figure 7:
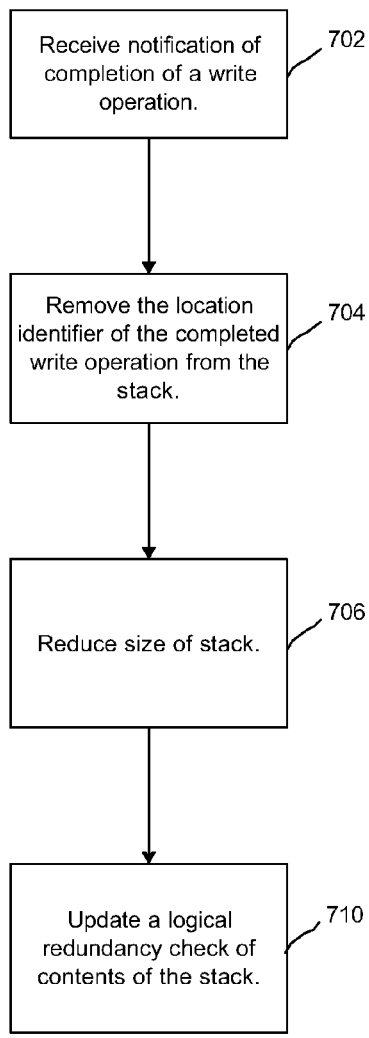
FIG. 7 illustrates operations of a storage controller in removing from a logic structure such as the logic structure of FIG. 3A, a destination location identifier for a write operation which has been completed.

FIG. 7 illustrates operations of a storage controller 106 in removing from a logic structure such as the logic structure 300 of FIG. 3A, a destination location identifier for a write operation which has been completed, that is, after all of the data of the write operation has been successfully written to the proper destination location in the storage 104. Upon receiving notification (block 702) of the completion of a write operation, the storage controller 106 locates within the stack 304, the location identifier of the completed write operation and removes (block 704) the location identifier from the stack 304.

Removing a location identifier from the stack 304 can leave blank or empty entries. In one embodiment, empty or blank array entries in the stack 304 may be eliminated to reduce (block 706) the size of the stack 304. Such a reduction in size can facilitate traversal of the stack during logical redundancy check updates or during error recovery.

Following reduction of the stack size, the logical redundancy check of the contents of the logic structure 300 may be updated (block 710). Again, the logical redundancy check may be performed for the contents of the stack 304 which, in the example of FIG. 3A, are the contents of array entries 304a-304i (when the array entry 304j is the next available entry) together with the contents of the stack index 306. The updated logical redundancy check may be stored (block 710) in the logical redundancy check 310. Thus, in some applications, the array entries such as array entries 304j-304n which do not contain a location identifier for a pending write operation and are not part of the stack 304, need not be traversed and may effectively be ignored during the logical redundancy check.

Figure 8:
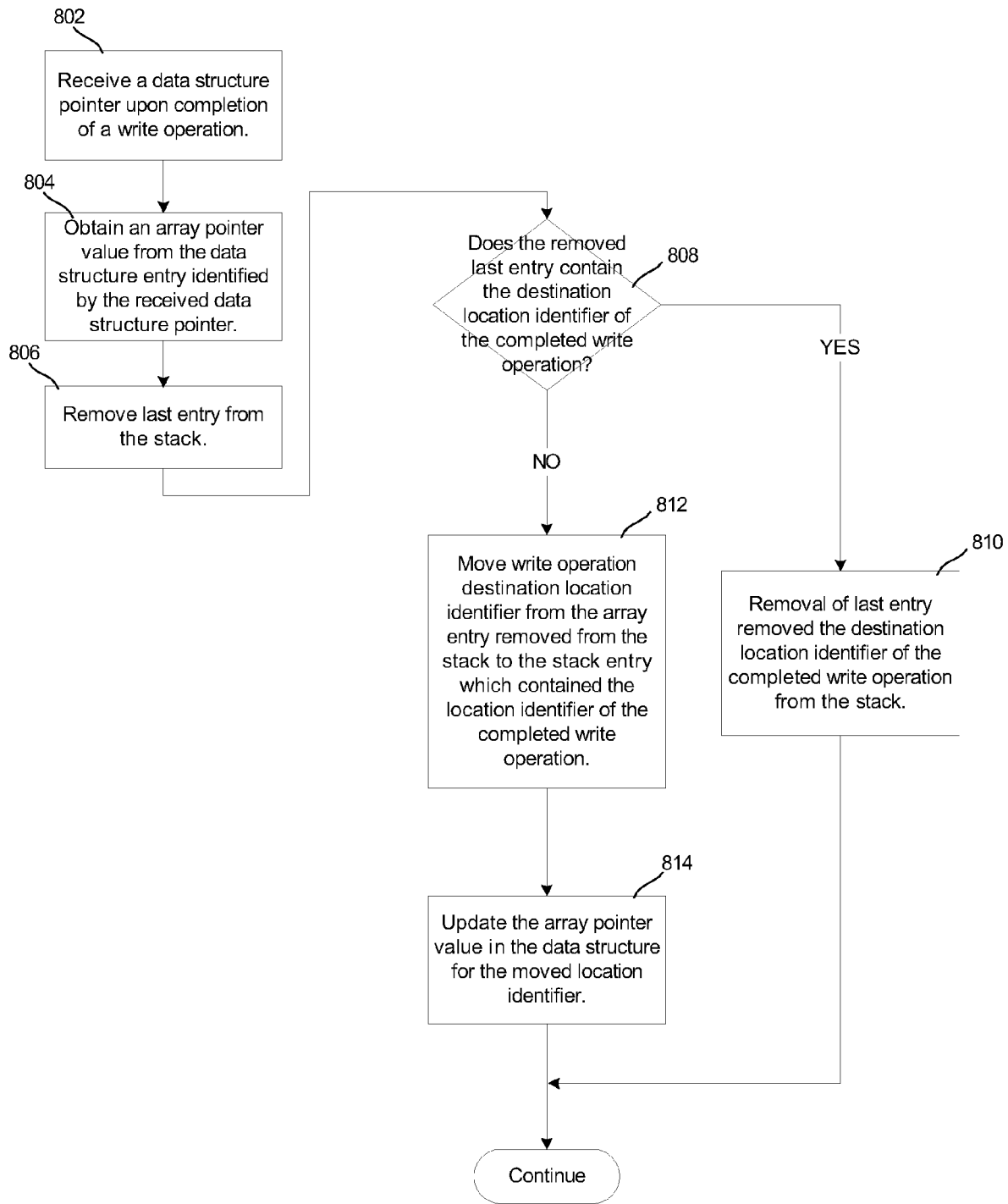
FIG. 8 illustrates a more detailed example of operations of a storage controller in removing from a logic structure, a destination location identifier for a write operation which has been completed.

In the illustrated embodiment, the storage controller is notified of the completion of a particular write operation by receiving (block 802, FIG. 8) a pointer to the particular data structure of the data structures 602a, 602b, . . . 602n, of the completed write operation. The storage controller 106 may then obtain (block 804) the value of the stack index stored in the field 606 of the particular data structure, and thereby locate the particular stack entry at which the track ID for the completed write operation is stored. The track ID stored at the stack entry identified by the value of the stack index obtained from the data structure for the completed write operation may then be removed from the stack 304 as described below.

It is appreciated that the notification of completion of a write operation may be obtained in a variety of different manners. It is further appreciated that the location of the array entry containing the destination location identifier may be determined in a variety of manners. For example, the write operation may directly provide the track ID of a completed write operation or may directly provide the array entry location for that track ID, to the storage controller 106.

In the illustrated embodiment, the storage controller 106 reduces the size of the stack 304 by removing (block 806) the last entry from the stack 304. In the illustrated example, this is achieved by decrementing the stack index 306 so that it points to the prior array entry of the stack 304. In the example of FIG. 3A, decrementing the stack index 306 will cause the stack index 306 to point to the array entry 304i rather than the array entry 304j. Accordingly, the last array entry of the stack 304 will be the prior array entry 304h. The array entry 304i will no longer be a part of the stack 304 but will instead be indicated as the next available array entry as indicated by the stack index 306.

Also, a determination (block 808) is made as to whether the removed last entry contains the destination location identifier of the completed write operation which is to be removed from the stack 304. If so, the destination location identifier of the completed write operation has been effectively removed from the stack 304 upon removal of the last array entry from the stack 304 as indicated in block 810. In the illustrated embodiment, the determination (block 808) as to whether the removed last entry contains the destination location identifier of the completed write operation, may be made by comparing the value of the stack index obtained (block 804) from the field 606 of data structure identified by the pointer supplied by the completed write operation, to the value of the decremented stack index. If there is a match, that is, the two index values are the same, then it is determined that the removed last entry contains the destination location identifier of the completed write operation which is removed from the stack 304 by the removal of the last entry from the stack 304.

In the example depicted in FIG. 3A, the last entry of the stack 304 is indicated to be the array entry 304*i* as noted above. Upon decrementing the stack index 306, the stack index 306 will point to the array entry 304*i* as the next entry available for writing a new location identifier instead of the array entry 304*j*. Hence, the last entry of the stack 304 will be the prior array entry 304*h*. If the value of the stack index obtained (block 804) from the field 606 of data structure identified by the pointer supplied by the completed write operation, points to the same array entry 304*i*, the correct location identifier will have been removed from the stack 304. In other words, if there is a match, that is, the two index values are the same, then it is determined that the removed last entry contains the destination location identifier of the completed write operation which is removed from the stack 304 by the removal of the last entry from the stack 304.

On the other hand, if it is determined (block 808) that the removed last entry does not contain the destination location identifier of the completed write operation, the removed array entry contains a valid location identifier for a pending write operation. Accordingly, the write operation destination location identifier from the array entry removed from the stack 304 is moved (block 812) to the stack entry which contained the location identifier of the completed write operation. By moving the valid location identifier from the removed array entry to the array entry containing the location identifier of the completed write operation, the location identifier of the completed write operation is overwritten and effectively removed from the stack 304.

. As noted above, in the illustrated embodiment, the determination (block 808) as to whether the removed last entry contains the destination location identifier of the completed write operation, may be made by comparing the value of the stack index obtained (block 804) from the field 606 of data structure identified by the pointer supplied by the completed write operation, to the value of the decremented stack index. If there is no match, that is, the two index values are not the same, then it is determined that the removed last entry contains a valid destination location identifier of a write operation which is still pending and therefore should not be removed from the stack 304 by the removal of the last entry from the stack 304. Accordingly, the write operation destination location identifier from the array entry removed from the stack 304 is moved (block 812) to the stack entry which contained the location identifier of the completed write operation as identified by the value of the stack index obtained (block 804) from the field 606 of data structure identified by the pointer supplied by the completed write operation.

Because the write operation destination location identifier is moved to another stack entry, the data structure for the pending write operation of that destination location identifier is updated (block 814) to indicate the location of the different stack entry to which the destination location identifier has been moved. In the illustrated embodiment, the write operation destination location identifier from the array entry removed from the stack 304 is moved (block 812) to the stack entry which contained the location identifier of the completed write operation as identified by the value of the stack index obtained (block 804) from the field 606 of data structure identified by the pointer supplied by the completed write operation. Hence, the obtained stack index value is stored in the field 606 of the data structure of the pending write operation for the moved destination location identifier.

In this manner, in the illustrated embodiment, an array entry is added to the stack 304 each time a location identifier for a pending write operation is added to the stack 304. Conversely, an array entry is removed from the stack 304 each time a write operation is completed and the location identifier of the completed write operation is removed from the stack. As a result, in one application, logical redundancy checks may be efficiently performed. In addition, in another application, during error recovery operations, a traversal of the array 302 may be limited to the array entries of the stack 304. Array entries which are not part of the stack do not contain destination location identifiers for pending write operations and may be ignored in one application. Because the array entries which are not part of the stack are ignored, destination locations for completed write operations in array entries outside the stack need not be erased.

Additional Implementation Details

The described techniques for write process management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain operations were described as performed by the processor complexes 122*a*, and 122*b*. In alternative implementations, certain operations described as performed by the processor complexes may be performed by a variety of computers, processors, and controllers.

In described implementations, certain operations were described as incrementing and decrementing indexes or counters. It is appreciated that the "counts" of counters may be positive or negative and that "incrementing" or "decrementing" a count can make an actual count more negative or more positive or less negative or less positive, depending upon the particular application.

The illustrated logic of FIGS. 4, 5, 7 and 8 show certain events occurring in a certain order. In alternative implementations, certain operations may be performed in a different order, modified or removed. Moreover, operations may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 9:
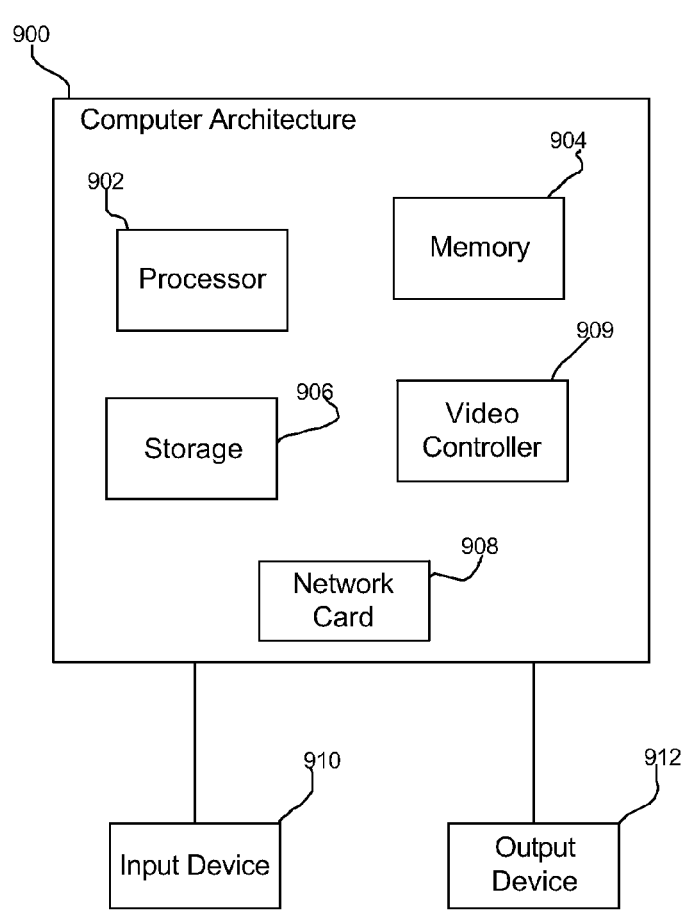
FIG. 9 illustrates an architecture of computing components in a network environment, such as the hosts, storage controllers, clusters, and any other computing devices.

FIG. 9 illustrates one implementation of a computer architecture 900 of the network components, such as the hosts and storage controller clusters shown in FIG. 2. The architecture 900 may include a processor 902 (e.g., a microprocessor), a memory 904 (e.g., a volatile memory device), and storage 906 (e.g., a non-volatile storage, such as magnetic disk drives, optical disk drives, a tape drive, etc.). The storage 906 may comprise an internal storage device or an attached or network accessible storage. Programs in the storage 906 are loaded into the memory 904 and executed by the processor 902 in a manner known in the art. The architecture further includes a network card 908 to enable communication with a network. An input device 910 is used to provide user input to the processor 902, and may include a keyboard, mouse, pen-stylus, microphone, touch sensitive display screen, or any other activation or input mechanism known in the art. An output device 912 is capable of rendering information transmitted from the processor 902, or other component, such as a display monitor, printer, storage, etc.

The foregoing description of various implementations has been presented for the purposes of illustration and description. It is not intended to be exhaustive or to limit the scope to the precise form disclosed. Many modifications and variations are possible in light of the above teaching.

What is claimed is:

1. An article of manufacture for data storage, comprising a computer readable storage medium having code which when executed by a processor causes operations to be performed, the operations comprising:
    obtaining a location identifier of a destination of a write operation;
    storing the location identifier in an available entry of an array, said entry being identified by an array pointer having a first value;
    storing the array pointer first value in a data structure entry;
    changing the value of said array pointer to a second value to identify another available array entry;
    receiving a data structure pointer upon completion of a write operation;
    obtaining an array pointer value from the data structure entry identified by the received data structure pointer; and
    removing the location identifier from the array entry identified by said obtained array pointer value wherein the removed location identifier identifies a completed write operation destination.

2. The article of claim 1 wherein the entries of the array in which location identifiers are stored form a stack of array entries and wherein said location identifier storing stores the location identifier of a write operation in the next available entry of said array and wherein said location identifier removing removes the location identifier of the completed write operation destination from the stack of array entries, and wherein the operations further comprise reducing the size of said stack of array entries.

3. An article of manufacture for data storage, comprising a computer readable storage medium having code which when executed by a processor causes operations to be performed, the operations comprising:
    obtaining a location identifier of a destination of a write operation;
    storing the location identifier in an available entry of an array of entries in nonvolatile storage, wherein the entries of the array in which location identifiers are stored form a stack of array entries and wherein said available entry being identified by an index pointer having a first value;
    incrementing the value of said index pointer to a second value to identify the next entry of the array as the next available entry of said array;
    receiving a data structure pointer upon completion of a write operation;
    obtaining an array pointer index value from the data structure entry identified by the received data structure pointer;
    removing the location identifier from the stack entry identified by said obtained array pointer index value;
    decrementing the value of said index;
    comparing said obtained index value to said decremented index value;
    if said obtained index value is different from said decremented index value, moving a write operation destination location identifier from the stack entry identified by the decremented index value to a stack entry identified by the obtained index value; and
    updating a logical redundancy check of contents including contents of the stack and the index.

4. The article of claim 3 wherein the operations further comprise storing the obtained index value in the data structure entry associated with the location identifier moved to the stack entry identified by the obtained index value.

5. A system comprising:
    a storage device adapted to store an array having an array pointer having a first value which identifies an available entry of said array;
    a digital data processing apparatus coupled to the storage device, wherein the digital data processing apparatus is configured to:
        obtain a location identifier of a destination of a write operation;
        store the location identifier in an available entry of said array identified by said array pointer having said first value;
        store the array pointer first value in a data structure entry;
        change the value of said array pointer to a second value to identify another available array entry;
        receive a data structure pointer upon completion of a write operation;
        obtain an array pointer value from the data structure entry identified by the received data structure pointer; and
        remove the location identifier from the array entry identified by said obtained array pointer value wherein the removed location identifier identifies a completed write operation destination.

6. The system of claim 5 wherein the entries of the array in which location identifiers are stored form a stack of array entries and wherein said location identifier storing stores the location identifier of a write operation in the next available entry of said array and wherein said location identifier removing removes the location identifier of the completed write operation destination from the stack of array entries, and the digital data processing apparatus is further configured to reduce the size of said stack of array entries.

7. A system for use with data structures having entries, comprising:

a non-volatile data storage device;

a digital data processing apparatus coupled to the storage device, wherein the digital data processing apparatus is configured to:

store in said storage device an array which includes a stack, said array having an array pointer having a first value which identifies an available entry of said array;

obtain a location identifier of a destination of a write operation;

store the location identifier in said entry identified by an index pointer having said first value; and increment the value of said array pointer to a second value to identify the next entry of the array as the next available entry of said array wherein said entry identified by said index pointer first value and containing said location identifier becomes a part of the stack;

receive a data structure pointer upon completion of a write operation;

obtain an array pointer index value from the data structure entry identified by the received data structure pointer;

remove the location identifier from the stack entry identified by said obtained array pointer index value;

decrement the value of said index;

compare said obtained index value to said decremented index value;

if said obtained index value is different from said decremented index value, move a write operation destination location identifier from the stack entry identified by the decremented index value to a stack entry identified by the obtained index value; and update a logical redundancy check of contents including contents of the stack and the index.

8. The system of claim 7 wherein the digital data processing apparatus is further configured to store the obtained index value in the data structure entry associated with the location identifier moved to the stack entry identified by the obtained index value.

9. A storage controller for use with a data storage device and a data structure having entries, comprising:

a digital data processing apparatus adapted to be coupled to the storage device, wherein the digital data processing apparatus is configured to:

store in said storage device an array having an array pointer having a first value which identifies an available entry of said array;

obtain a location identifier of a destination of a write operation;

store the location identifier in an available entry of said array identified by said array pointer having said first value;

store the array pointer first value in a data structure entry;

change the value of said array pointer to a second value to identify another available array entry;

receive a data structure pointer upon completion of a write operation;

obtain an array pointer value from the data structure entry identified by the received data structure pointer; and remove the location identifier from the array entry identified by said obtained array pointer value wherein the removed location identifier identifies a completed write operation destination.

10. The storage controller of claim 9 wherein the entries of the array in which location identifiers are stored form a stack of array entries and wherein said location identifier storing stores the location identifier of a write operation in the next available entry of said array and wherein said location identifier removing removes the location identifier of the completed write operation destination from the stack of array entries, and the digital data processing apparatus is further configured to reduce the size of said stack of array entries.

11. A storage controller for use with a non-volatile data storage device and a data structure having entries, comprising:

a digital data processing apparatus adapted to be coupled to the storage device, wherein the digital data processing apparatus is configured to:

store in said storage device an array which includes a stack, said array having an array pointer having a first value which identifies an available entry of said array;

obtain a location identifier of a destination of a write operation;

store the location identifier in said entry identified by an index pointer having said first value; and increment the value of said array pointer to a second value to identify the next entry of the array as the next available entry of said array wherein said entry identified by said index pointer first value and containing said location identifier becomes a part of the stack;

receive a data structure pointer upon completion of a write operation;

obtain an array pointer index value from the data structure entry identified by the received data structure pointer;

remove the location identifier from the stack entry identified by said obtained array pointer index value;

decrement the value of said index;

compare said obtained index value to said decremented index value;

if said obtained index value is different from said decremented index value, move a write operation destination location identifier from the stack entry identified by the decremented index value to a stack entry identified by the obtained index value; and update a logical redundancy check of contents including contents of the stack and the index.

12. The storage controller of claim 11 wherein the digital data processing apparatus is further configured to store the obtained index value in the data structure entry associated with the location identifier moved to the stack entry identified by the obtained index value.

* * * * *